(12) United States Patent
Takahashi

(10) Patent No.: US 7,463,817 B2
(45) Date of Patent: Dec. 9, 2008

(54) RECORDING AND REPRODUCING APPARATUS

(75) Inventor: Kazuhiro Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 10/314,663

(22) Filed: Dec. 9, 2002

(65) Prior Publication Data

US 2003/0118318 A1 Jun. 26, 2003

(30) Foreign Application Priority Data

Dec. 25, 2001 (JP) ............................. 2001-392335
Nov. 26, 2002 (JP) ............................. 2002-342771

(51) Int. Cl.
*G11B 27/36* (2006.01)
*G11B 27/02* (2006.01)
*H04N 5/91* (2006.01)
*H04N 5/93* (2006.01)

(52) U.S. Cl. .............................. 386/83; 386/52; 386/54; 386/55; 386/95; 386/96; 725/12

(58) Field of Classification Search ................. 386/95, 386/96, 107, 52, 57, 83, 125, 104–106; 348/231.3, 348/152–155, 231.6, 130; 725/12
See application file for complete search history.

(56) References Cited

U.S. PATENT DOCUMENTS

| | | | | |
|---|---|---|---|---|
| 2,050,852 A | * | 8/1936 | Moore | 340/662 |
| 2,480,607 A | * | 8/1949 | Rackey et al. | 73/647 |
| 5,146,353 A | * | 9/1992 | Isoguchi et al. | 386/107 |
| 5,532,833 A | * | 7/1996 | Hong et al. | 386/77 |
| 5,581,297 A | * | 12/1996 | Koz et al. | 348/152 |
| 5,613,032 A | * | 3/1997 | Cruz et al. | 386/69 |
| 5,684,514 A | * | 11/1997 | Branscomb | 345/547 |
| 5,703,994 A | * | 12/1997 | Lee et al. | 386/52 |
| 5,713,021 A | * | 1/1998 | Kondo et al. | 707/103 R |
| 5,717,814 A | * | 2/1998 | Abecassis | 386/46 |
| 5,758,259 A | * | 5/1998 | Lawler | 725/45 |
| 5,778,137 A | * | 7/1998 | Nielsen et al. | 386/68 |
| 5,826,206 A | * | 10/1998 | Nemeth | 701/35 |
| 6,052,508 A | * | 4/2000 | Mincy et al. | 386/96 |

(Continued)

FOREIGN PATENT DOCUMENTS

JP 09-231728 9/1997

(Continued)

OTHER PUBLICATIONS

Lesser, N. _Avid VideoShop_. Cambridge, MA: Avid Technology, 1993. pp. 204-205, 309. TR899.A95 1993.*

(Continued)

*Primary Examiner*—Thai Tran
*Assistant Examiner*—David N Werner
(74) *Attorney, Agent, or Firm*—Cowan, Liebowitz & Latman, P.C.

(57) ABSTRACT

A recording and reproducing apparatus for recording and reproducing an information signal on and from a recording medium, which generates a play list indicating a reproduction sequence of the information signal, based on additional information pertaining to a status of the recording and reproducing apparatus during reproduction of the information signal, and records the play list onto the recording medium.

8 Claims, 11 Drawing Sheets

U.S. PATENT DOCUMENTS

| | | | |
|---|---|---|---|
| 6,259,858 B1* | 7/2001 | Ando et al. | 386/95 |
| 6,377,519 B1* | 4/2002 | Lee et al. | 369/30.04 |
| 6,408,128 B1* | 6/2002 | Abecassis | 386/68 |
| 6,519,410 B1* | 2/2003 | Okada et al. | 386/46 |
| 6,748,395 B1* | 6/2004 | Picker et al. | 707/102 |
| 6,856,757 B2* | 2/2005 | Dagtas | 386/68 |
| 6,934,461 B1* | 8/2005 | Strub et al. | 386/46 |
| 6,970,639 B1* | 11/2005 | McGrath et al. | 386/52 |
| 2002/0101518 A1* | 8/2002 | Suda | 348/231 |
| 2002/0131760 A1* | 9/2002 | Hirai et al. | 386/52 |

FOREIGN PATENT DOCUMENTS

| | | |
|---|---|---|
| JP | 2000-078559 | 3/2000 |
| JP | 2000-331422 | 11/2000 |
| JP | 2002-344904 | 11/2002 |

OTHER PUBLICATIONS

Navco Security Systems, "Model 1700 System Controller Operating Instructions", 1997.*

Smith et al. "Video Skimming and Characterization through the Combination of Image and Language Understanding". _Proc. IEEE Int. Workshop on Content-based Access of Image and Video Databases (ICCV98)_. 1998: pp. 61-70.*

* cited by examiner

FIG. 4

```
<smil>
<head>
<meta name="title" content="sample"/>
<meta name="author" content="taro"/>
<meta name="copyright" content="(c)2000 taro"/>
<meta name="e-mail" content="taro@OOOOOO.co.jp"/>
</head>
<body>
<video src="take2000_0901.mpg"/>
<video src="take95_0902.mpg"/>
</body>
</smil>
```

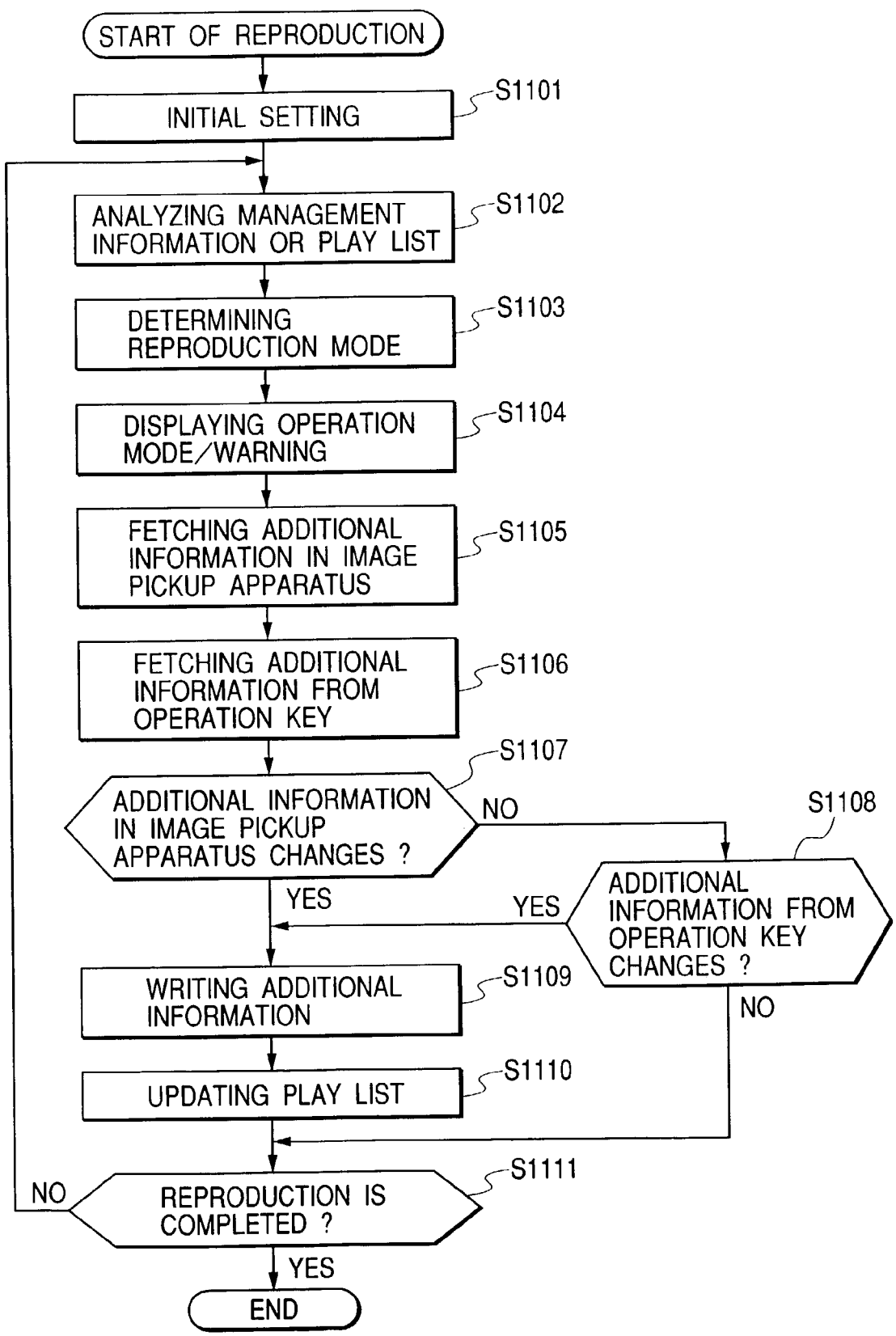

FIG. 12

(A) HISTORY OF PREVIOUS REPRODUCTION

| A×1 | B×15 | C×1 | D notPB | E×1 |

(B) EXAMPLE 1 OF CURRENT REPRODUCTION

| A×1 | C×1 | E×1 |

(C) WARNING EXAMPLE OF CURRENT REPRODUCTION EXAMPLE 1

SEARCH SCENE HAS BEEN SKIPPED

NON REPRODUCTION HAS BEEN SKIPPED

FIG. 13

(A) HISTORY OF PREVIOUS REPRODUCTION

| A×1 | B×15 | C×1 | D notPB | E×1 |

(B) EXAMPLE 1 OF CURRENT REPRODUCTION

| B×15 | D notPB |

(C) WARNING EXAMPLE OF CURRENT REPRODUCTION EXAMPLE 1

NORMAL REPRODUCTION HAS BEEN SKIPPED

NORMAL REPRODUCTION HAS BEEN SKIPPED

RECORDING AND REPRODUCING APPARATUS

BACKGROUND OF THE INVENTION

1. Field of the Invention

The present invention relates to a recording and reproducing apparatus, and more particularly to an apparatus for controlling recording and reproduction operations by using additional information relating to a status of the apparatus during reproduction.

2. Related Background Art

Conventionally, a recording and reproducing apparatus such as a video camera is structured so as to record image information obtained by photographing, and audio information corresponding to the image information (hereinafter, image information and audio information are referred to as "image/audio information"), together with additional information, onto a recording medium.

Here, examples of the additional information include: photographing information such as an image pickup date/time, exposure, shutter speed, and a photographing mode; apparatus main unit information such as a camera-type, a lens-type, and the like; and apparatus setting information such as an apparatus environment setting.

Examples of usages for the additional information include displaying the additional information in a display unit when in a reproduction mode of the recording and reproducing apparatus, so that a user can confirm the photographing information, and recording the additional information onto the recording medium together with the image/audio information, to thereby save the photographing information corresponding to the image/audio information.

Japanese Patent Application Laid-Open No. 07-99605 (corresponding to U.S. Pat. No. 5,581,362) discloses a technique for recording the additional information at the time of photographing in this way together with the image information and using the additional information to extract a search image during reproduction.

Incidentally, in recent years, the amount of information involved in image/audio information to be recorded onto the recording medium is increasing due to increased image quality and image size, and the like. Further, due to advances in semiconductor technology, the recording capacity of the recording medium is increasing rapidly.

For example, with respect to card-type recording media, products capable of 128 megabytes and 256 megabytes have appeared; with respect to magneto-optical disks, recording capacities of several gigabytes have been achieved at an inexpensive price; and with respect to hard disks, recording capacities of several tens of gigabytes have been achieved at an inexpensive price. In this way, as the recording capacity of the recording medium increases, recording processing time of the recording and reproducing apparatus is increasing each day.

Further, as the recording medium, instead of magnetic tape or other such tape-type recording media used frequently up until now, card-type recording media using semiconductor memory and disk media such as hard disks and magneto-optical disks are frequently used. These card-type and disk-type recording media do not require rewinding and forwarding operations as in the conventional tape-type recording media, and thus high-speed data access is possible. Also, random access is possible which has been impossible with the tape-type recording media. Accordingly, with respect to access speed of the recent card-type and disk-type recording media, a speed is achieved at which simultaneous recording and reproducing is possible.

Further, the card-type and disk-type recording media do not require a tape loading mechanism that has been necessary in the tape-type recording medium.

Therefore, with this type of card-type and disk-type recording media, it is possible to achieve a mechanism which can be simply attached to and removed from the apparatus, and thus it is anticipated that they will also become widely popular as removable media used in video cameras etc.

In this way, when the recording capacity of the recording medium increases, the recordable amount of information also increases correspondingly, and this requires much time to reproduce all the information recorded on the recording medium.

Further, for example, a reproduced portion (a picked-up scene) which the user wants to actually view, is generally a portion of all the information recorded on the recording medium. Therefore, a method for the user to accurately retrieve the desired scene, or creation of a program for optimal viewing, is needed. However, up until now, such could not be achieved.

SUMMARY OF THE INVENTION

The present invention has been made in order to achieve the above-mentioned problems.

Another object of the present invention is to make it possible for a user to reproduce desired information easily and efficiently.

In order to achieve the above-mentioned objects, according to an aspect of the present invention, there is provided a recording and reproducing apparatus for recording and reproducing an information signal to an from a recording medium, comprising: recording/reproducing means for recording and reproducing the information signal to and from the recording medium; and control means for generating a play list indicating a reproduction sequence of the information signal, based on additional information relating to a status of the apparatus during reproduction of the information signal by the recording/reproducing means, and controlling the recording/reproducing means so as to record the play list onto the recording medium.

Other objects and characteristics of the present invention will be apparent from the detailed description of the aspects of the invention with reference to the following drawings.

BRIEF DESCRIPTION OF THE DRAWINGS

FIG. 4 is a diagram showing a play list;

FIG. 11 is a flowchart showing a reproduction operation by the image pickup apparatus according to a fourth embodiment;

FIG. 12 is a diagram for explaining a method of determining a reproduction mode; and FIG. 13 is a diagram for explaining a method of determining the reproduction mode.

DETAILED DESCRIPTION OF THE PREFERRED EMBODIMENTS

Hereinafter, description will be made of embodiments of the present invention, using the drawings.

First Embodiment

Figure 1:
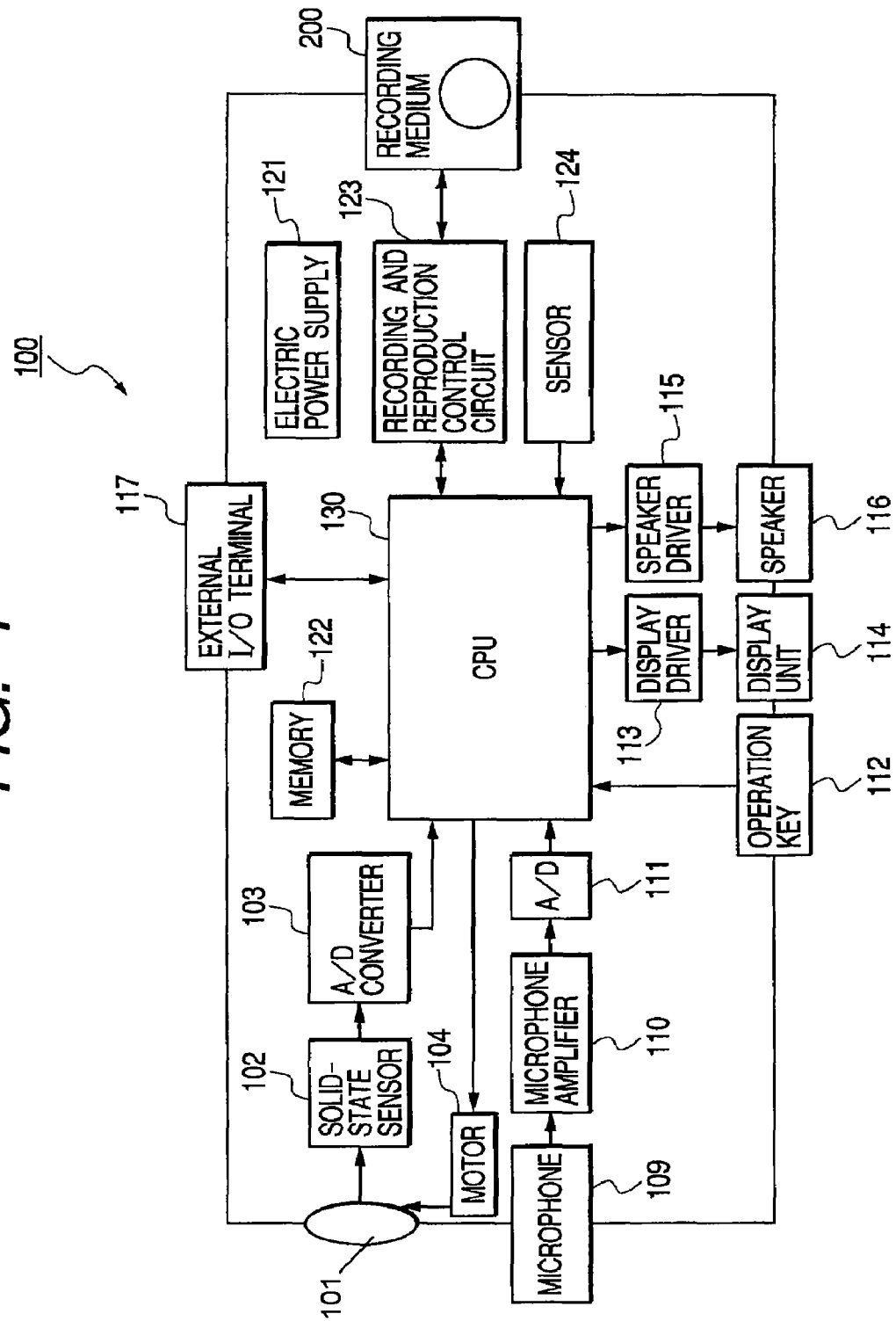
FIG. 1 is a block diagram showing a structure of an image pickup apparatus employing the present invention.

The present invention is used in, for example, an image pickup apparatus 100 as shown in FIG. 1.

The image pickup apparatus 100 of this embodiment has functions of recording information into a recording medium 200, and reproducing information from the recording medium 200. More specifically, the image pickup apparatus 100 is arranged so as to record additional information obtained by the image pickup apparatus 100 during reproduction of an information signal from the recording medium 200, onto the recording medium 200.

Hereinbelow, a structure and operation of the image pickup apparatus 100 based on this embodiment will be described more specifically.

Structure of Image Pickup Apparatus 100

As shown in FIG. 1, the image pickup apparatus 100 includes: a lens 101 for taking in an image (light from an object image); a solid-state sensor 102 such as a CCD or the like for converting the object image light passing through the lens 101 into an electrical signal and outputting it; an A/D converter 103 for converting an output signal from the solid-state sensor 102 into digital data (image data); a motor for driving the lens 101; a microphone 109 for picking up audio; a microphone amplifier 110 for amplifying an audio signal from the microphone 109 and outputting it; an A/D converter 111 for converting the output signal from the microphone amplifier 110 into digital data (audio data); operation keys 112 for operating the image pickup apparatus 100; a display driver 113 for generating display data from the image data; a display unit 114 for performing an image display of the display data obtained from the display driver 113; a speaker driver 115 for audio output; a speaker 116 for outputting the audio data from the speaker driver 115 as audio; an external I/O terminal 117 for inputting and outputting the various information from the outside into and from the image pickup apparatus 100; a recording and reproduction control circuit 123 for controlling recording and reproduction operations of a recording medium 200 which can be attached to and removed from the image pickup apparatus 100; a sensor 124 including a GPS circuit, a temperature/humidity circuit, and the like; a power source 121 for the image pickup apparatus 100; a CPU 130 for governing operation controls of the entire image pickup apparatus 100; and a memory 122 for storing processing programs and various data for executing the control processing by the CPU 130.

Recording Operation of the Image Pickup Apparatus 100

In a state where a power supply is provided from the power source 121 to the image pickup apparatus 100, first, the object image light entered through the lens 101, is converted into the electrical signal by the solid-state sensor 102 to be outputted. The A/D converter 103 samples the output signal from the solid-state sensor 102 to convert it into digital image data, and provides this digital data to the CPU 130.

At this time, the CPU 130 drives/controls the motor 104 to move the lens 101 to execute an autofocus function and zoom function. Further, the CPU 130 generates a timing signal for outputting the signal from the solid-state sensor 102. Accordingly, an image signal is outputted from the solid-state sensor 102 based on the timing signal.

On the other hand, the audio corresponding to the moving image data obtained from the solid-state sensor 102 is inputted from the microphone 109 as the audio signal, and is amplified by the microphone amplifier 110 and outputted. The A/D converter 111 samples the output signal from the microphone amplifier 110, converts the sampled signal into digital audio data and provides this digital data to the CPU 130.

On the digital image data received from the A/D converter 103, the CPU 130 performs basic processing such as color separation, white balance, gamma compensation and aperture compensation, and performs additional processing based on image size, image quality adjustments, positioning adjustments and the like which are set by a user using the operation keys 112, and further performs encoding processing based on a pre-set encoding method to compress the amount of information and obtain compressed image data.

Further, on the audio data from the A/D converter 111, the CPU 130 performs additional processing based on sound quality adjustments and the like set by the user using the operation keys 112, and encoding processing based on a pre-set encoding method to compress the amount of information and obtain compressed audio data.

Then, the CPU 130 supplies the compressed image data and the compressed audio data, together with control data (including information about the image pickup apparatus 100 itself, information about settings for image, audio, and other recordings, and information about the image-capture environment and other such additional image-capture information), to the recording and reproduction control circuit 123 as recording data, and also, when necessary, the CPU 130 outputs this data through the external I/O terminal 117, and further provides it to the display driver 113.

The display driver 113 provides the recording data from the CPU 130 to the display unit 114 as display image data to be used for confirmation. The display unit 114 displays an image corresponding to the image data from the display driver 113. Accordingly, the user can confirm the image currently being recorded.

On the other hand, the recording and reproduction control circuit 123 records the compressed image data and the compressed audio data, and the relevant control data that were outputted from the CPU 130, into the recording medium 200 as a file, under management by a file system. The term "file system" here refers to a structural system including management information and file data for performing management of files. By arranging this type of file system as a common file system, it becomes possible to reproduce recorded data even from different recording media or on different recording and reproducing apparatuses.

Further, in this embodiment, the mutually corresponding moving image data, audio data and control data are recorded as a single file. Further, in accordance in this embodiment, the moving image data, the audio data, and the corresponding control data obtained during a period from the recording start instruction from the operation keys 112 and to the recording stop instruction, are recorded as a single file.

As the recording medium 200, for example, a removable medium which can be attached to and removed from the image pickup apparatus 100 is used. Examples thereof include random access media such as memory cards including MMC (multi-media card), SSFDC (compact memory card), Compact Flash(R), and PC Card (card for personal computer), or disk media including FD (flexible disk), MD (minidisk) and DVD (Digital Versatile Disc)-RAM.

Figure 2:
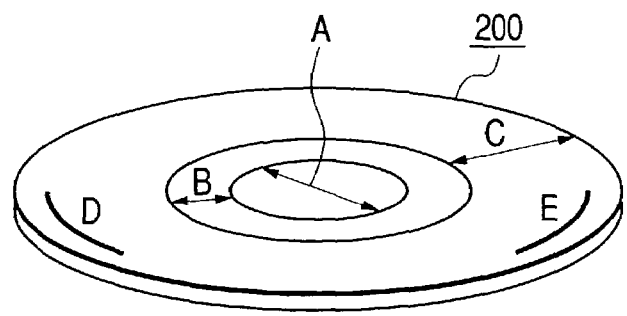
FIG. 2 is a diagram for explaining a recording medium used in the image pickup apparatus.

This embodiment uses a magneto-optical disk from among the recording media mentioned above. FIG. 2 shows an outward appearance of the recording medium 200 in the case where the magneto-optical disk is used.

The recording medium 200, as shown in FIG. 2, has a hole (A) for chucking during the disk rotation, a management region (B) for recording data for managing data recorded on the disk, and a data region (C) where actual recorded data (D, E) are recorded.

Specifically, in the management area (B), there is recorded information such as the file system, a disk ID, attributes of files (recording scenes), and positions where file data are actually recorded. Further, in the management area (B) it is also possible to record information such as the above-mentioned image-capture additional information, or a play list, or the like.

Reproduction Operation of the Image Pickup Apparatus 100

The reproduction operation of the image pickup apparatus 100 is the chief characteristic of the image pickup apparatus 100. Here, as an example, description will be made of the operation in a case of reproducing file data (designated file data) selected by the user by operating the operation keys 112 from among data (a file group) recorded on the recording medium 200.

First, the recording and reproduction control circuit 123 reproduces the designated file data from the recording medium 200 under control of the CPU 130, and supplies this reproduced data to the CPU 130. The CPU 130 analyzes the content of the designated file data from the recording and reproduction control circuit 123 and separates it into various kinds of data to fetch the image data, the audio data, and the control data.

In a case where the image data is the compressed image data, the CPU 130 performs expansion processing on the image data fetched from the designated file data and supplies the expanded data to the display driver 113. Further, in a case where the image data is not the compressed image data, the CPU 130 supplies it to the display driver 113 as it is. The display driver 113 supplies the data from the CPU 130 to the display unit 114 as image data for display. The display unit 114 performs an image display of the image data from the display driver 113. As a result, the user can confirm the image currently being reproduced on the display screen.

Further, in a case where the audio data is the compressed audio data, the CPU 130 performs expansion processing on the audio data fetched from the designated file data and supplies the expanded data to the speaker driver 115. Further, in a case where the audio data is not the compressed audio data, the CPU 130 supplies it to the speaker driver 115 as it is. The speaker driver 115 outputs the data from the CPU 130 from the speaker 116 as audio.

Further, based on the control data fetched from the designated file data, the CPU 130 performs processing such as effects and retouching on the image data and the audio data as needed. The result therefrom is displayed on the display unit 114 through the display driver 113, or is outputted from the speaker 116 through the speaker driver 115. Further, as needed, the CPU 130 outputs the image data, the audio data, and the control data fetched from the designated file data, through the external I/O terminal 117 to the outside of the device.

Further, in parallel with the above-mentioned operation of reproducing the information from the recording medium 200, the CPU 130 executes control processing to record the additional information obtained from the image pickup apparatus 100 onto the recording medium 200. This structure is the chief characteristic of this embodiment.

The additional information obtained by the image pickup apparatus 100 (the information generated by the image pickup apparatus 100 itself) during reproduction may be, for example, the following information.

Information regarding the lens 101 (lens information)

Image information obtained as a result of deconstruction and analysis of the lens information by the CPU 130 (information such as the type of the captured image, the type of the captured object, the condition of the captured object, and the state of the captured object)

Information regarding the microphone 109 (microphone information)

Audio information obtained as a result of deconstruction and analysis of the microphone information by the CPU 130 (information such as the type of the audio and the audio level)

Reproduction time information obtained from a timer (not shown in the drawings) provided in the image pickup apparatus 100

Position information of the image pickup apparatus 100, obtained from the GPS circuit in the sensor 124, and surrounding environment information of the image pickup apparatus 100, obtained from the temperature/humidity circuit in the sensor 124

Device information such as the name, functions, and other such aspects of the image pickup apparatus 100

Setting information of the image pickup apparatus 100

Information relating to an operation mode and state (such as a reproduction end position and reproduction operation history) of the image pickup apparatus 100

Information regarding conditions of external connections to the image pickup apparatus 100

The additional information as described above includes information the user (operator or viewer) inputs into the image pickup apparatus 100. This information input is performed using the operation keys 112 shown in FIG. 3, for example.

Figure 3:
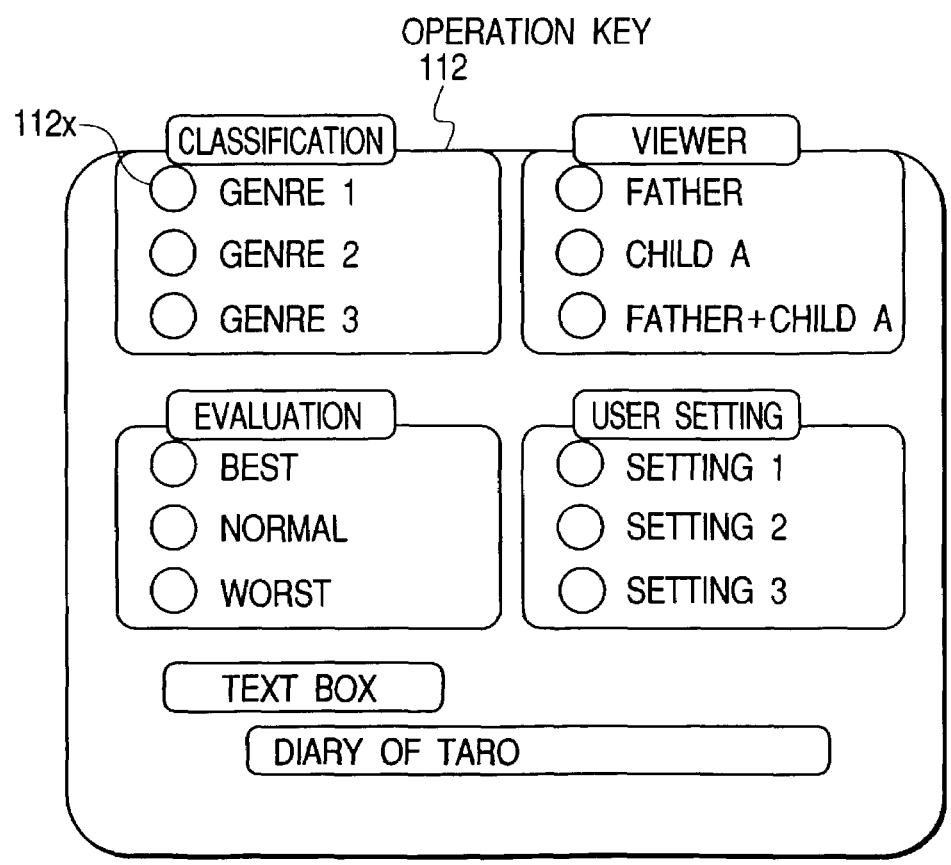
FIG. 3 is a diagram showing operation keys of the image pickup apparatus.

The operation keys 112, as shown in FIG. 3, are composed of operation switches 112x respectively corresponding to items of "classification", "viewer", "evaluation", and "user setting" (in the diagram, these are indicated as buttons "0"). The "classification" item is provided with three-level selection buttons corresponding to "genre 1", "genre 2" and "genre 3". The "evaluation" item is provided with three-level selection buttons corresponding to "best", "normal", and "worst". The "viewer" item is provided with three-level selection buttons corresponding to "father", "child A", and "father and child A". The "user setting" item is provided with three-level selection buttons corresponding to "setting 1", "setting 2", and "setting 3".

In the "user setting" item, the items and setting levels that can be set using the operation keys 112 can be freely set by the user. Therefore, the user can set all or a part of the items category, "evaluation" and "viewer" and the setting levels thereof as the user desires. When this is performed, the content of the settings can include a number of viewers, a viewing location, and the like.

Further, the operation keys 112 are provided with an input "text box" item, as shown in FIG. 3. FIG. 3 shows an example in which "Diary of Taro" is inputted into the "text box" input item.

The CPU 130 processes these additional information obtained by the image pickup apparatus 100 or the additional information inputted by the user, and records them onto the recording medium 200 via the recording and reproduction control circuit 123.

Further, the CPU 130 generates the additional information for every each field or frame of the image being reproduced from the recording medium 200 or based on the timing that the content of the additional information was altered, and records the generated additional information by means of the recording and reproduction control circuit 123. Further, at this time, the additional information is recorded into an given internal area (the above-mentioned management region or data region) in the file currently being reproduced, or into a new data region provided to a part of the management region relating to the file currently being reproduced.

Further, when the additional information is recorded to the recording medium 200, the CPU 130 automatically generates and records a play list corresponding to the content in the additional information.

Here, the play list refers to a list (file) defining a reproduction sequence, a reproduction operation, a reproduction environment, and the like of the image information, the additional information etc. recorded in the recording medium 200. Further, this content can be displayed on the display unit 114 together with the reproduced image.

In accordance with this embodiment, the play list is written in Synchronized Multimedia Integration Language (SMIL).

By using SMIL, it is possible to do items (1) through (3) below:

(1) describe the chronological activity of the representations;

(2) describe the layout of the representations on the screen; and (3) connect hyperlinks to multimedia objects.

FIG. 4 is a diagram showing an example of a play list automatically generated according to the additional information. As shown in FIG. 4, the play list includes specific information such as a file title ("sample"), author ("taro"), and date/time ("2000_0901"), and there is also written a description for simply reproducing a designated moving image file "take2000_0901.mpg") etc.

In a case where the reproduction operation is executed based on a previously generated play list, the CPU 130 performs processing of addition and edit on the previously generated play list.

Figure 5:
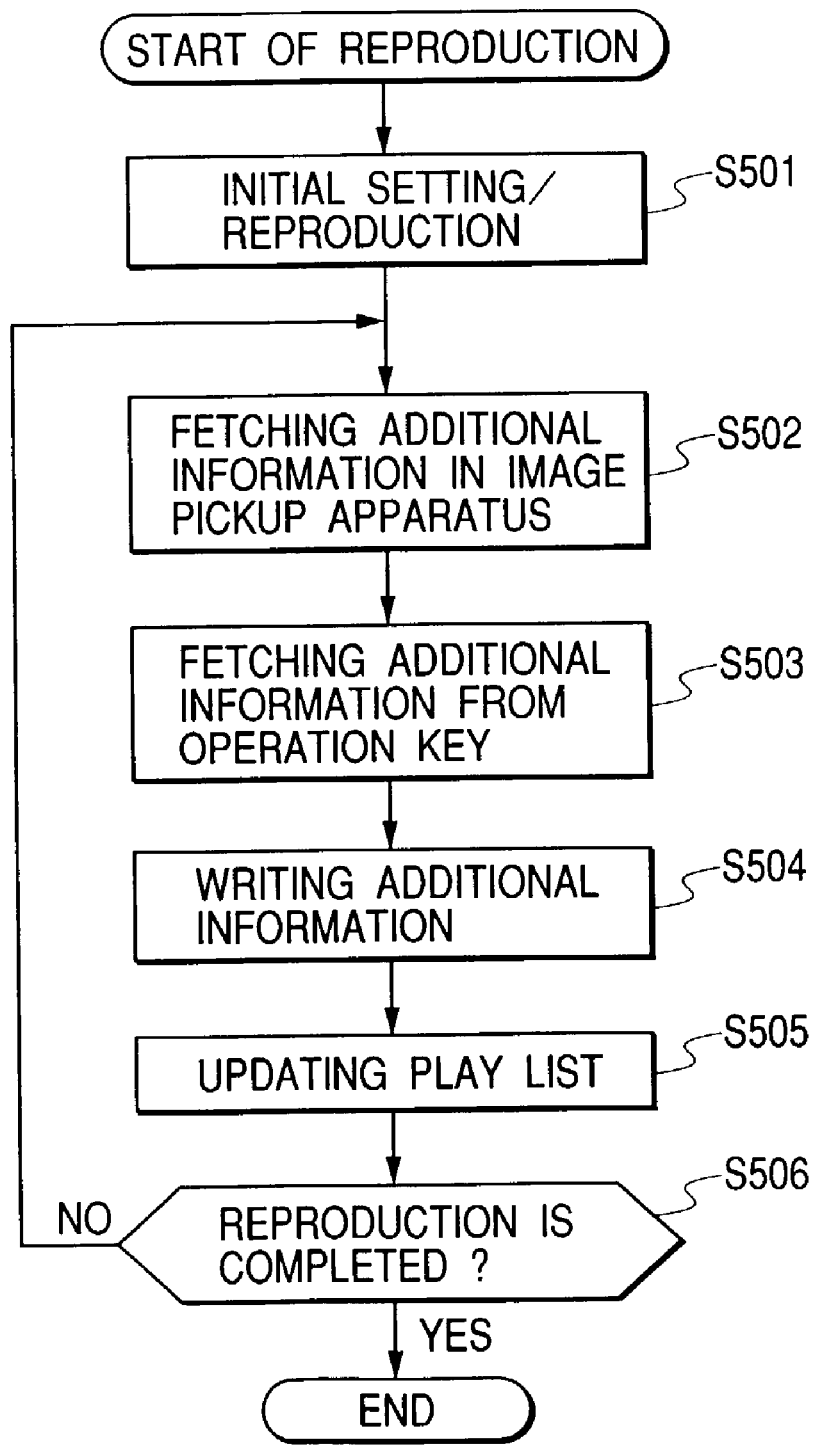
FIG. 5 is a flowchart showing a reproduction operation of the image pickup apparatus.
Figure 6:
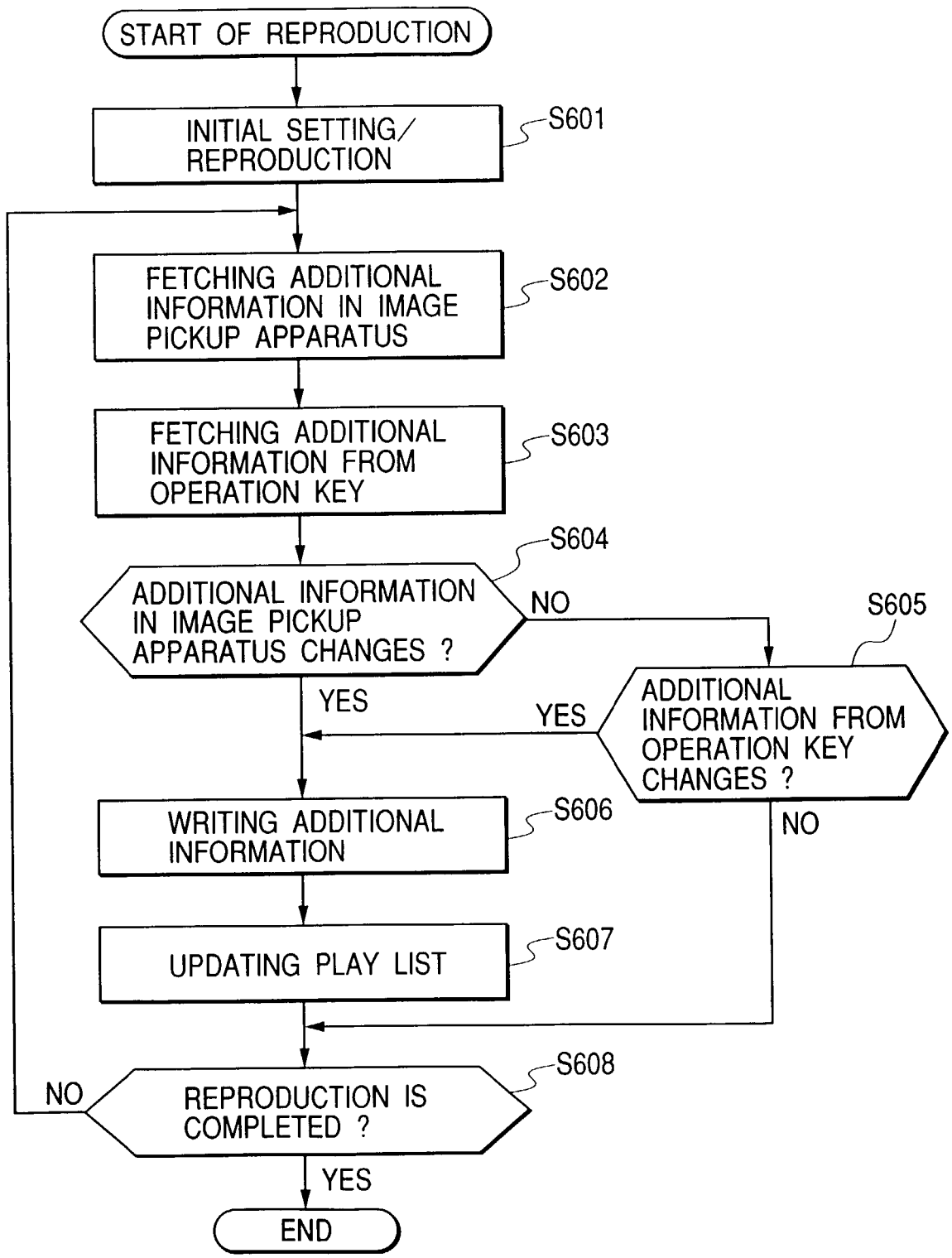
FIG. 6 is a flowchart showing a reproduction operation of the image pickup apparatus.

FIG. 5 and FIG. 6 are flowcharts for explaining the reproduction described above performed by the image pickup apparatus 100.

FIG. 5 is a flowchart showing processing performed by the CPU 130 in a case that the additional information is generated during reproduction at a predetermined period, for example, for every frame and recorded onto the recording medium 200.

First, at step S501, when the instruction of reproduction operation is provided to the image pickup apparatus 100 by the user, initial settings for the reproduction operation are set, and the reproduction processing is started. Next, the various additional information obtained within the image pickup apparatus 100 are fetched (step S502). Further, the additional information inputted by the user using the operation keys 112 is fetched (step S503), and these additional information are recorded via the recording and reproduction control circuit 123 onto the recording medium 200 (step S504).

Next, based on the additional information, the play list is generated, or the content of the play list is updated (step S505). Then, it is determined whether or not the reproduction processing of the recording medium 200 is completed or not. As a result of the determination, in a case where the reproduction is not completed, the processing repeats execution of the processing from step S502, and in a case where the reproduction is completed, the processing ends (step S506).

Next, description will be made of processing shown in FIG. 6. FIG. 6 is a flowchart showing processing by the CPU 130 in which the additional information is recorded onto the recording medium 200, and the play list is generated or updated only in a case where the content of the fetched additional information has changed. By employing the above-mentioned structure, the load on the CPU is reduced, as compared with the case where the additional information is periodically recorded as shown in FIG. 5.

First, when the user instructs the image pickup apparatus 100 to perform the reproduction operation, an initial setting for performing the reproduction operation is set, and the reproduction operation is started (step S601).

Next, the additional information obtained within the image pickup apparatus 100 is fetched (step S602), and the additional information inputted by the user using the operation keys 112 is fetched (step S603). Then, it is determined whether or not the content of the additional information fetched at step S312 (the additional information obtained within the image pickup apparatus 100) has changed (step S604). As a result of this determination, in a case where the content of the additional information has changed, the processing advances to step S606, and in a case where it has not changed, the processing advances to step S605.

As a result of the determination at step S604, in the case where the content of the additional information obtained within the image pickup apparatus 100 has not changed, the CPU 130 determines whether or not the content of the additional information fetched at step S603 (the additional information inputted by the user) has changed. As a result of the determination, in a case where it has changed, the processing advances to step S606, and in a case where it has not changed, the processing advances to step S608.

When the results of the determinations at step S604 and step S360 indicate that the content of either the additional information obtained within the image pickup apparatus 100 or the additional information inputted by the user has changed, the additional information obtained in the image pickup apparatus 100 and the additional information inputted by the user are recorded via the recording and reproduction control circuit 123 onto the recording medium 200. Then, based on the additional information, the play list is generated or updated (step S607).

Then, it is determined whether or not the reproduction processing on the designated file is completed (step S608). As a result of the determination, in a case where the reproduction is not completed, the processing from step S602 is repeated, and in a case where the reproduction is completed, the processing ends.

In this way, this embodiment is structured such that, during the reproduction of the information signal from the recording medium 200, the additional information (including the information inputted with the operation keys 112) obtained within the image pickup apparatus 100, is recorded onto the recording medium 200. Therefore, the next time the reproduction operation is to be performed, the reproduction operation can be performed based on the additional information that was recorded on the recording medium previously.

For example, as described below, by utilizing the reproduction end position information that is included in the additional information recorded during the previous reproduction operation, it becomes possible to start the subsequent reproduction at the position where the previous reproduction ended. Alternatively, by utilizing the reproduction operation history information that is included in the additional information recorded during the previous reproduction operation, it becomes possible to control the reproduction operation (for example, restriction of a reproduction speed) while performing the reproduction.

Therefore, this embodiment has a construction which could not be realized conventionally, particularly in video cameras and the like for private use. That is, the additional information obtained by the image pickup apparatus 100 is recorded onto the recording medium 200 during the reproduction operation, and the additional information is recorded as the play list, whereby providing functions with large advantage added value.

Second Embodiment

Figure 7:
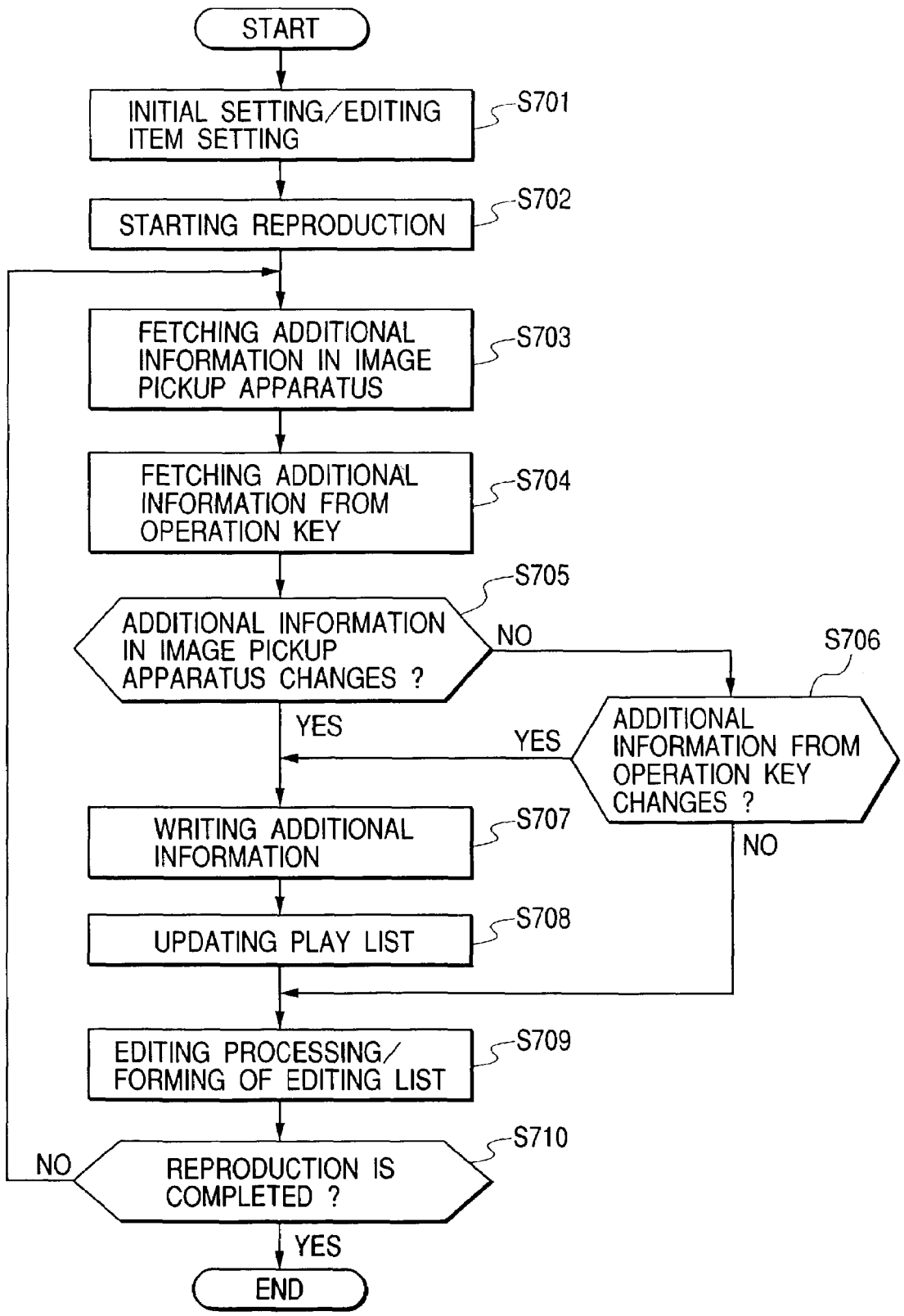
FIG. 7 is a flowchart showing a reproduction operation of the image pickup apparatus according to a second embodiment.

According to this embodiment, in the case where the additional information is recorded during the reproduction as described above, in the various additional information, the user presets the item for controlling the subsequent reproduction operation (the evaluation item) or the method of controlling the subsequent reproduction operation (an editing method), and the play list is generated according to the additional information that was obtained during the reproduction, and according to the evaluation item and the editing method which have been set. FIG. 7 is a flowchart showing the reproduction processing by the CPU 130 in this embodiment.

First, when the user instructs the image pickup apparatus 100 to perform the reproduction operation, the initial setting for the reproduction operation is set and a setting for the evaluation item and the editing method instructed by the user is set (step S701). When this is performed, the user operates the operation keys 112 to set the evaluation item and the editing method before the reproduction is performed. Here, the evaluation item in the editing specifically refers to information generated by the image pickup apparatus 100, as described below.

Information regarding the lens 101 (lens information)

Image information obtained as a result of deconstruction and analysis of the lens information by the CPU 130 (information such as the type of the captured image, the type of the captured objects, the condition of the captured object, and the state of the captured object)

Information regarding the microphone 109 (microphone information)

Audio information obtained as a result of deconstruction and analysis of the microphone information by the CPU 130 (information such as the type of the audio and the audio level)

Reproduction time information obtained from a timer (not shown in the drawings) provided in the image pickup apparatus 100

Position information of the image pickup apparatus 100, obtained from the GPS circuit in the sensor 124, and surrounding environment information of the image pickup apparatus 100, obtained from the temperature/humidity circuit in the sensor 124

Device information of the name, functions and other such aspects of the image pickup apparatus 100

Setting information of the image pickup apparatus 100

Information relating to an operation mode and state (such as a reproduction end position and reproduction operation history) of the image pickup apparatus 100

Information regarding conditions of external connections to the image pickup apparatus 100

Further, an additional information item which the user inputted voluntarily using the operation keys 112, corresponds to the evaluation item in the editing.

Further, the editing method referred to here is a specific method for indicating how to use the evaluation item set by the user when the user selects the scene that should be reproduced. For example, the editing method may be a method for selecting a corresponding scene in which the evaluation item appears, a method for selecting a corresponding scene in which the evaluation item appears with its value greater than a predetermined value, a method for determining deleting or selecting a corresponding scene based on a result of logical computational processing of a plurality of evaluation items with weighting, or the like.

Next, the reproduction operation is started (step S702), the additional information obtained in the image pickup apparatus 100 is fetched (step S703), and the additional information inputted by the user using the operation keys 112 is fetched (step S704).

Next, it is determined whether or not the content of the additional information fetched at step S703 has changed (step S705). As a result of this determination, in a case where the content of the additional information has changed, the processing advances to step S707, and in a case where it has not changed, the processing advances to step S706.

As a result of the determination at step S705, in the case where the content of the additional information obtained within the image pickup apparatus 100 has not changed, it is determined whether or not the content of the additional information fetched at step S704 has changed (step 706). As a result of the determination, in a case where it has changed, the processing advances to step S707, and in a case where it has not changed, the processing advances to step S709.

When the results of the determinations at step S705 and step S706 indicate that the additional information obtained within the image pickup apparatus 100 or the additional information inputted by the user has changed, the additional information obtained in the image pickup apparatus 100 and the additional information inputted by the user are recorded via the recording and reproduction control circuit 123 onto the recording medium 200.

Then, based on the content of the additional information, the play list is generated or the contents thereof are updated.

Next, the CPU 130 generates an editing list based on the evaluation item and the editing method set at step S701 (step S709). The editing list referred to here may be generated as the play list or may be generated as a special play list onto the recording medium 200, or into a memory inside the image pickup apparatus 100, for example. According to this embodiment, the editing list is generated as a new play list and is recorded onto the recording medium 200.

Then, it is determined whether or not the reproduction processing on the recording medium 200 is completed (step S710). As a result of the determination, in a case where the reproduction is not completed, the processing from step S703 is repeated, and in a case where the reproduction is completed, the processing ends.

Now, more detailed description will be made of the processing at step S709.

For example, in a case where "information relating to ambient audio" is used as the evaluation item during editing, and the editing method is set so as to select a corresponding scene in which the ambient audio information exceeds a given threshold, the CPU 130 determines the level of the audio signal input from the microphone during the reproduction operation by the image pickup apparatus 100, and in a case where the level of the audio signal exceeds the threshold, a play list for controlling the operation for reproducing is formed such that the scene is selected to be reproduced.

By doing this, in a case where the reproduction is performed next time according to the play list, it is possible to select and reproduce a scene where loud cheering occurs during the reproduction.

Further, in a case where "information relating to a certain person" is used as the evaluating item during editing, and the editing method is set to select a corresponding scene which the certain person is viewing, the CPU 130 deconstructs and analyzes the image obtained by the lens 101 and the solid-state sensor 102 during the reproduction operation by the image pickup apparatus 100, thereby generating a play list for performing control to reproduction operations to select and reproduce a scene which the certain person is viewing. Note that, in this case, before the reproduction is started, it is necessary to direct the lens 101 in the direction of the person viewing the reproduced image.

Further, in a case where "reproduction operation by a certain user" is used as the evaluation item for editing, and the editing method is set so as to select a scene provided by the reproduction operation by this user, the CPU 130 generates a play list for controlling reproduction operations to select and reproduce a scene provided by the reproduction operation performed by the user, during the reproduction operation of the image pickup apparatus 100.

Figure 8:
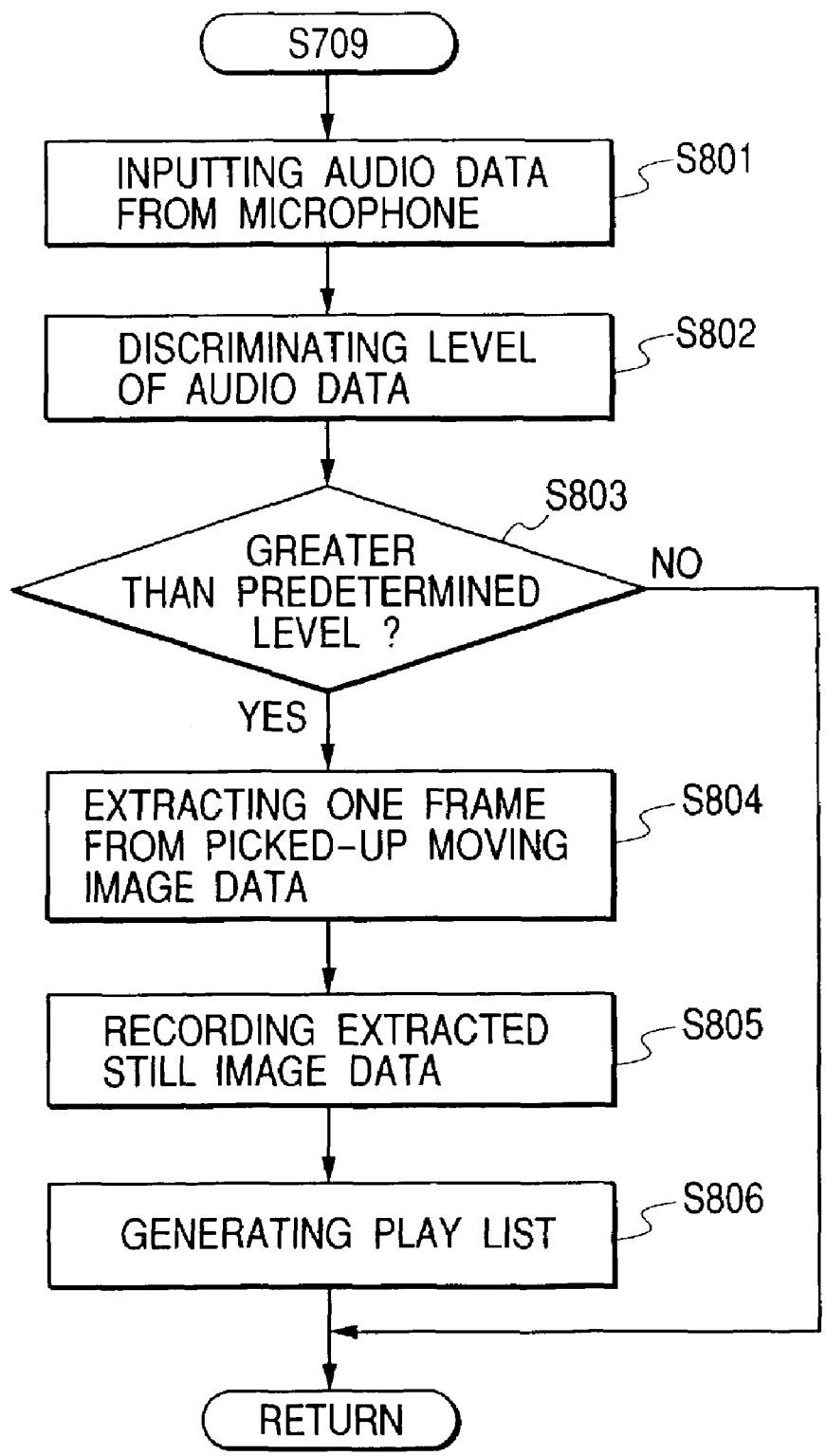
FIG. 8 is a flowchart showing a specific operation in editing processing.

Further, description will be made of yet another specific processing, using the flow chart in FIG. 8. FIG. 8 is a flow chart showing specific processing at step S709 in a case where "ambient audio level" is set as the evaluating item, and the editing method is set as a method for superposing still images one on another during reproduction.

First, the CPU 130 inputs the audio data inputted from the microphone 109 (step S801) and determines the level of this audio data (step S802). Then, in a case where the level of the audio data is greater than a predetermined level (step S803), one frame from picked-up moving image data, which was picked up by the lens 101 and the solid-state sensor 102 and outputted from the A/D 103, is extracted as still image data, and is recorded in the memory 122 (step S804).

Next, this single frame of still image data recorded in the memory is recorded into a given area of the recording medium 200 by means of the recording and reproduction control circuit 123 (step S805). In accordance with this embodiment, the still image data is recorded into a header or a footer or other such predetermined region in the reproduced file, or into a predetermined area in management information relating to the file being reproduced. At this time, in a case where information indicating that the still image data is the still image data obtained during reproduction, ID discriminating a plurality of still images similarly extracted and recorded during reproduction of a single file, or the like is attached and recorded.

Next, a play list is generated for controlling a reproduction sequence to superpose the extracted still images one on another as described below and display them according to the timing of the extraction at step S804 with respect to the file currently being reproduced, and this play list is recorded onto the recording medium 200 (step S806). The timing at which the extracted still images should be superposed one on another and the IDs of the still images which should be superposed are written into the play list.

Figure 9:
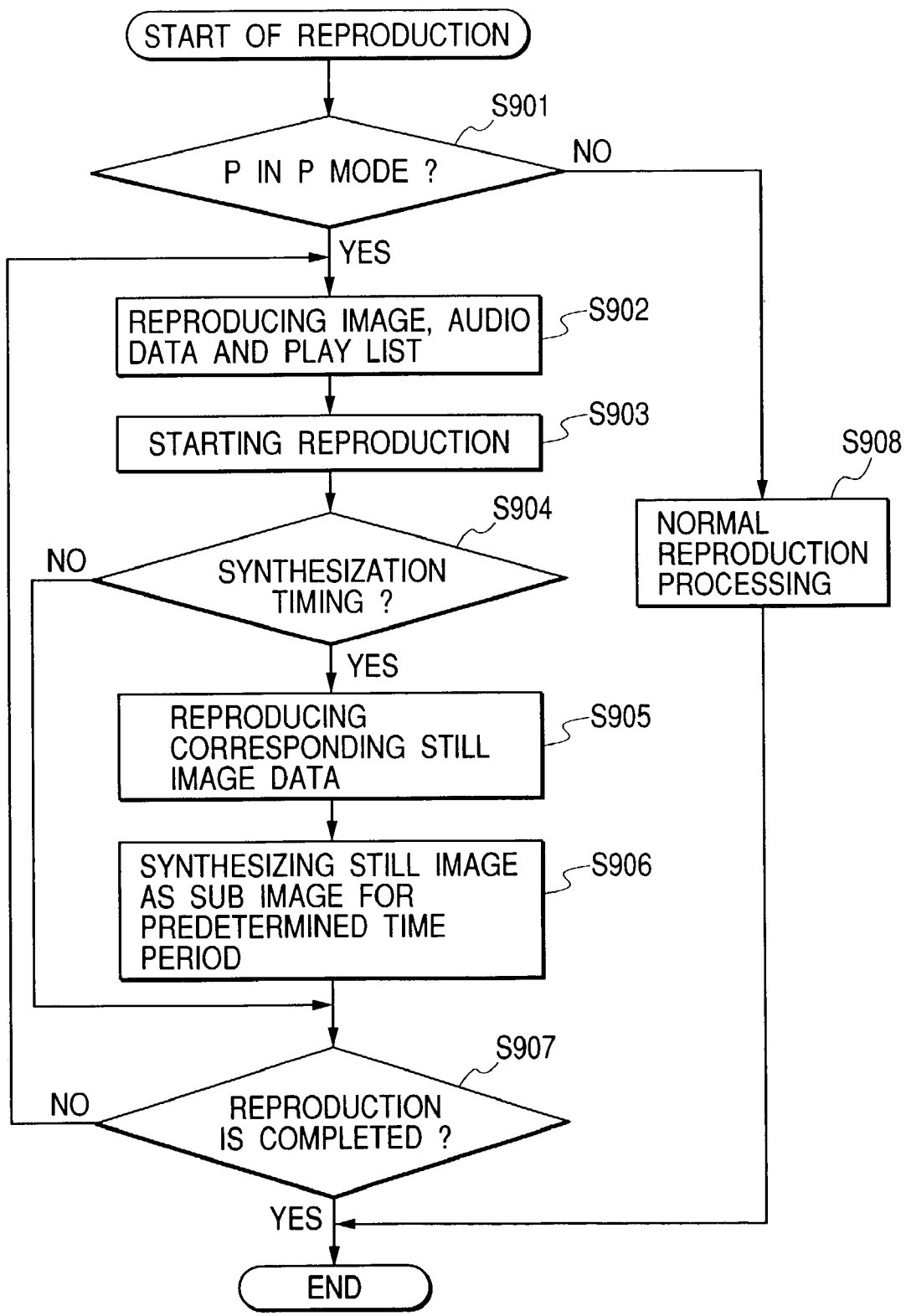
FIG. 9 is a flowchart showing a reproduction operation using an editing list.

Next, using the flowchart in FIG. 9, an explanation will be made regarding processing for superposing and displaying the still images thus extracted according to the audio level.

First, before the reproduction is started, determination is made as to whether or not a synthesized reproduction mode (a picture-in-picture mode) was set by the user (step S901). In a case where it is determined that the picture-in-picture mode has not been set, the normal reproduction processing depicted in FIG. 5 to FIG. 7 is performed (step S908).

Further, in a case where it has been set, the image and audio data of the designated file and the play list file corresponding to the designated file are reproduced from the recording medium 200 (step S902), and the reproduction of the image and audio data is started (step S903). Then, based on the content of the play list, determination is made as to whether or not it is the designated synthesization timing (step S904). In a case where it is the designated synthesization timing, the corresponding still image data is reproduced from the recording medium 200 (step S905), and the still image data is synthesized as a subimage for a predetermined time period, for example, 5 seconds, with the moving image currently being reproduced (step S906). Further, in a case where it is determined at step S904 that the timing is not the designated synthesization timing, the reproduction is continued just as it is. Then it is determined whether or not the reproduction is completed (step S907), and in a case where it is not completed, the processing returns to step S902.

In this way, in the case where the input audio level obtained from the microphone 109 during reproduction is greater than the threshold, the still image is picked up, and at the time of reproduction it is synthesized and displayed, so that the state of the user viewing the scene with the loud cheering or the like during reproduction can be recorded, and further, a novel function that can synthesize and display this image during reproduction can be achieved.

In this way, in accordance with this embodiment, the results produced from accurately searching for the scene(s) desired by the user can be provided as the editing list.

Then, during reproduction, a reproduction mode based on the editing list can be selected, so that the scene(s) desired by the user can be easily reproduced, and various editing results can be easily obtained.

Third Embodiment

Figure 10:
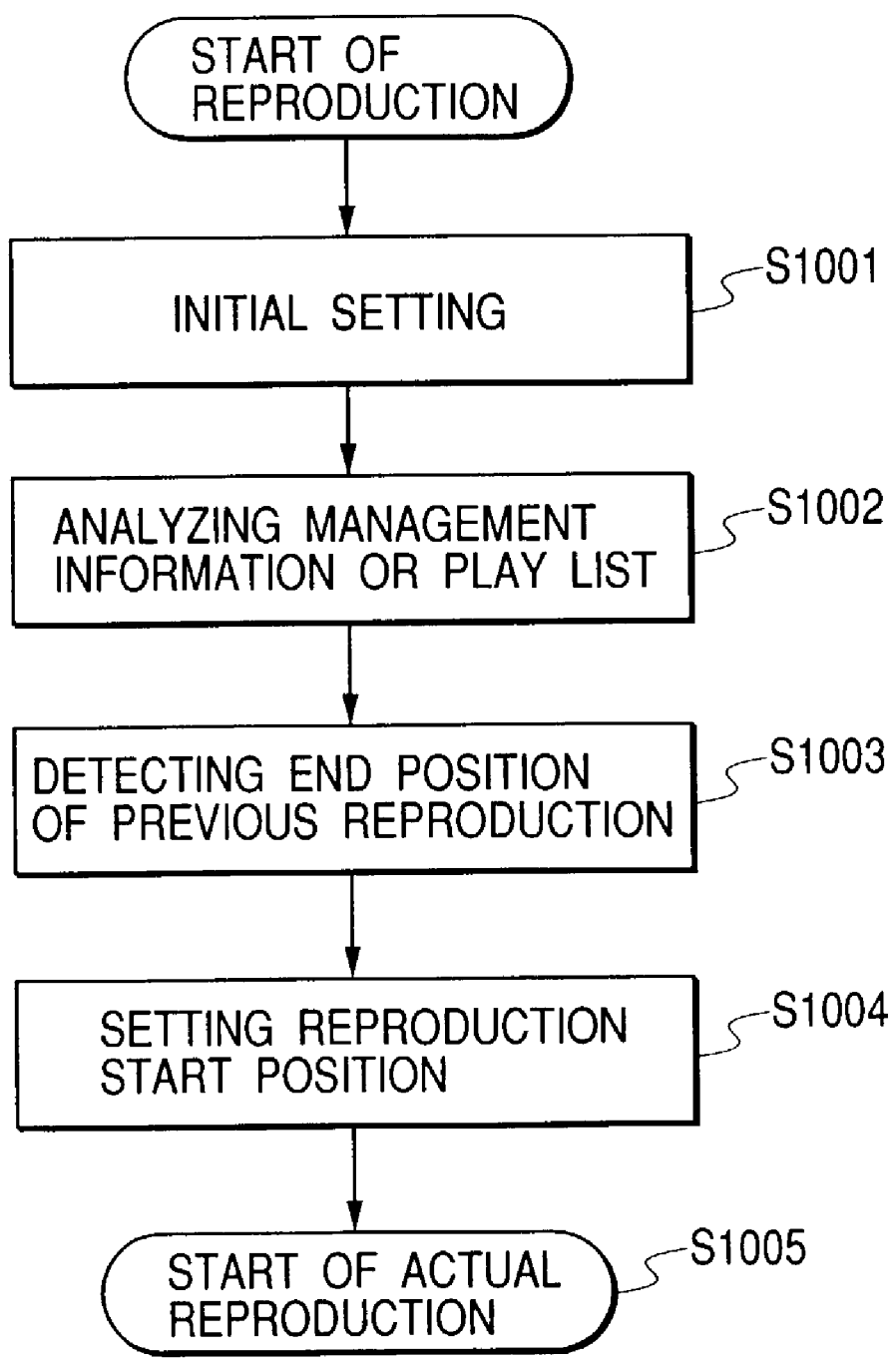
FIG. 10 is a flowchart showing a reproduction operation by the image pickup apparatus according to a third embodiment.

In accordance with this embodiment, the image pickup apparatus 100 shown in FIG. 1 performs reproduction processing according to the flowchart shown in FIG. 10.

First, in accordance with this embodiment, in the case where the recording medium 200 storing the additional information obtained from the processing shown in FIG. 6 is reproduced, at step S602, the reproduction position information is fetched as the additional information obtained in the image pickup apparatus 100 all the time.

When the user gives the image pickup apparatus 100 the instruction to perform the reproduction operation, the CPU 130 performs an initial setting for the reproduction operation, and starts the reproduction operation (step S1101). Next, it analyzes the management information or the play list recorded in the recording medium 200 (step S1102), and extracts the information of the end position of the previous reproduction (step S1103).

Then, the previous reproduction end position fetched at step S1003 is set as the reproduction start position for the current reproduction (step S1004), and an instruction is given to the recording and reproduction control circuit 123 to start reproduction from this reproduction start position (step S1005). Accordingly, reproduction can be performed from the previous reproduction end position.

Note that, in this embodiment, for example in a case where the previous operation mode of the image pickup apparatus 100 is a sequence from image pickup 1, reproduction 1, image pickup 2, reproduction 2, and to rewind, the end position of reproduction 2 becomes the position where reproduction is started the next time. However, the present invention is not limited to this configuration. Rather, a configuration may be also possible in which the next reproduction is started from the end position of reproduction 1, or in which the next reproduction is started from an end position of any one of operation modes.

Further, for example, the current operation mode or the reproduction start position may be selected/determined based on the previous operation status obtained from the additional information.

Fourth Embodiment

According to this embodiment, the image pickup apparatus 100 shown in FIG. 1 performs reproduction processing according to the flowchart shown in FIG. 11.

First, when the user gives the image pickup apparatus 100 the instruction to perform the reproduction operation, the CPU 130 performs an initial setting for the reproduction operation, and starts the reproduction operation (step S1101). Next, it analyzes the management information or the play list recorded in the recording medium 200 (step S1102), and determines and sets the reproduction mode according to a manner described below (step S1103).

Here, in a case where the reproduction mode designated by the user and the reproduction mode determined at step S1103 are different from each other, a notification (a warning notice) about this is provided to the user, and the user is informed of the actual reproduction mode (the reproduction mode determined at step S1103). The notification method used at this time may be display of a message on the display unit 114.

Next, the additional information obtained within the image pickup apparatus 100 is fetched (step S1105), and the additional information inputted by the user using the operation keys 112 is fetched (step S1106). Then, it is determined whether or not the content of the additional information fetched at step S1105 has changed. As a result of this determination, in a case where the content of the additional information has changed, the processing advances to step S1109, and in a case where it has not changed, the processing advances to step S1108.

As a result of the determination at step S1107, in the case where the content of the additional information obtained within the image pickup apparatus 100 has not changed, the CPU 130 determines whether or not the content of the additional information fetched at step S1106 has changed. As a result of the determination, in a case where it has changed, the processing advances to step S1109, and in a case where it has not changed, the processing advances to step S1111.

When the results of the determinations at step S1107 and step S1108 indicate that the content of either the additional information obtained within the image pickup apparatus 100 or the additional information inputted by the user has changed, the additional information obtained in the image pickup apparatus 100 and the additional information inputted by the user are recorded via the recording and reproduction control circuit 123 onto the recording medium 200. Then, based on the additional information, the play list is generated or updated.

Then, CPU 130 determines whether or not the reproduction processing on the recording medium 200 is completed. As a result of the determination, in a case where the reproduction is not completed, the processing from step S1102 is repeated, and in a case where the reproduction is completed, the processing ends.

Here, specific description will be made of the processing at step S1103. FIG. 12 and FIG. 13 are diagrams showing one example of a method of determining the reproduction mode according to this embodiment.

First, Row A in FIG. 12 shows previous reproduction history information obtained from the additional information. Here, in the previous reproduction operation, a scene A was reproduced ×1 reproduction (normal reproduction), a scene B was reproduced as ×15 (fast forward reproduction), a scene C was not reproduced (fast forward, rewind, etc.), and a scene D was ×1 reproduction (normal reproduction), in sequence.

Row B in FIG. 12 shows a reproduction mode that is determined and set for the current reproduction, according to the reproduction history information shown in row A of FIG. 12. Therefore, in this case, the CPU 130 determines and sets the reproduction mode so as to continuously reproduce scenes A, C and E which were normally reproduced during the previous reproduction (i.e., scenes in which the user showed interest during the previous reproduction, for example).

Row C in FIG. 12 shows an example of content notified to the user in a case where the current reproduction mode shown in Row B in FIG. 12 is different from the reproduction mode determined by the user. That is, at points of change between scenes or at corresponding time interval, the CPU 130 warns/notifies the user as shown in Row C of FIG. 12. Here, when switching from scene A to scene C, the warning notice is given with a message of "Search Scene has been Skipped", and when switching from scene C to scene E the warning notice is given with a message of "Non-Reproduced Scene has been Skipped".

On the other hand, similarly, in the reproduction mode determination method shown in FIG. 13, Row A in FIG. 13 shows previous reproduction history information which has been obtained from the additional information, and Row B in FIG. 13 shows the reproduction mode that is determined and set for the current reproduction based on the reproduction history information shown in Row A of FIG. 13. Here, the CPU 130 extracts the scenes B and D which were not normally reproduced the previous time (the scenes to which the user did not pay attention during the previous reproduction) and determines and sets a reproduction mode for automatically reproducing these.

Row C in FIG. 13 shows an example of content notified to the user in a case where the current reproduction mode shown in row B of FIG. 13 is different from the reproduction mode designated by the user. Here, the CPU 130 warns/notifies the user when the scene B reproduction is started and when the scene D reproduction is started, with a message of "Normal Reproduction has been Skipped".

According to this configuration, the reproduction mode can be automatically determined in an appropriate manner, whereby it is possible to automatically reproduce either the normally reproduced part that was viewed previously or the part which was not reproduced normally. Further, either the scene which the user viewed with interest the previous time, or the scene to which the user did not pay attention, can be reproduced automatically, thus improving viewing effects and efficiency of viewing time. In other words, since the additional information recorded in the recording medium 200 during the previous reproduction operation can be effectively put to use, it becomes possible to provide convenient operability and novel functionalities in the subsequent reproduction operations.

Note that, the present invention is not limited to the reproduction mode determination method shown in FIG. 12 and in FIG. 13. For example, a configuration is also possible in which the user operates the operation keys 112 to select an optional condition or a combination of a plurality of conditions to determine the reproduction mode.

Further, the object of the present invention can also be achieved by providing, to a system or to a device, a recording medium storing software program code for realizing a host and a terminal of the First Embodiment through the Fourth Embodiment, and having a computer (or a CPU or an MPU) in this system or device read and execute the program code stored in the recording medium.

In this case, the program code itself that is read out from the recording medium realizes the functions of the First Embodiment through the Fourth Embodiment, and the present invention is constituted by the recording medium storing the program code and by the program code.

As the recording media for providing the program code, it is possible to use a ROM, a flexible disk, a hard disk, an optical disk, a magneto-optical disk, a CD-ROM, a CD-R, magnetic tape, a non-volatile memory card, and the like.

Further, the present invention not only includes the configuration in which the functions of the First Embodiment through the Fourth Embodiment realized by executing the program code read out by the computer, but also a configuration in which an OS or the like running on the computer performs a part or all of the actual processing, based on instructions from the program code, and the functions of the First Embodiment through the Fourth Embodiment are realized by this processing.

Further, the present invention also includes a configuration in the program code that is read out from the recording medium is written to a function expansion board inserted into the computer or is written into a memory provided to a function expansion unit connected to the computer, and after that, a CPU or the like which is provided to the function expansion board or to a the function expansion unit performs a portion or all of the actual processing, based on the instructions from the program code, and the functions of the First Embodiment through the Fourth Embodiment are realized by this processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording and reproducing apparatus comprising:
   image input means for inputting an image signal;
   audio input means for inputting an audio signal;
   recording means for recording the image signal input by said image input means and the audio signal associated with the image signal on a recording medium;
   reproducing means for reproducing the image signal and the audio signal from the recording medium;
   detecting means for detecting a status of the audio signal being inputted by said audio input means;
   control means for operating said audio input means and said detecting means during the reproduction of the image signal and the audio signal by said reproducing means to detect a level of the input audio signal for every frame of the reproduced image signal;
   comparing means for comparing the level of the input audio signal, detected by said detecting means for every frame of the input audio signal, with a threshold value; and
   play list generating means for selecting, based on a comparison result, a specific scene including a frame for which the detected level of the input audio signal exceeds the threshold value, and generating a play list for controlling a reproduction sequence of the image signal and the audio signal to select and reproduce the specific scene from the image signal and the audio signal, recorded on the recording medium,
   wherein said recording means records the play list generated by said control means on the recording medium.

2. An apparatus according to claim 1, wherein said control means selects the specific portion of the image signal and the audio signal where the audio signal being inputted by said audio input means during the reproduction of the image signal and the audio signal by said reproducing means is in a predetermined state.

3. An apparatus according to claim 1, wherein said detecting means outputs an additional information indicating the status of the audio signal being inputted by said audio input means during a reproduction of the image signal and the audio signal by said reproducing means, and said control means generates the play list based on the additional information output from said detecting means.

4. An imaging apparatus comprising:
   image pickup means;
   audio input means for inputting an audio signal;
   recording/reproducing means for recording and reproducing a moving image signal obtained by the image pickup means, and an audio signal obtained by the audio input means, on and from a recording medium; and
   control means for extracting a single-frame still image from the moving image signal being outputted from the image pickup means, based on a status of the audio signal being inputted from the audio input means during a reproduction of the moving image signal and the audio signal by said recording/reproducing means, and controlling said recording/reproducing means so as to record a single-frame still image signal thus extracted onto the recording medium in correspondence with the moving image signal.

5. An apparatus according to claim 4, wherein said control means generates a play list for controlling a reproduction operation of said recording/reproducing means so as to reproduce a still image signal according to a timing at which the still image is extracted, and outputs the play list to said recording/reproducing means and records it onto the recording medium.

6. An apparatus according to claim 4, wherein said control means reproduces a still image signal according to a timing at which the still image signal is extracted, generates a play list for controlling a reproduction operation of said recording/reproducing means so as to synthesize the still image signal with the moving image signal to output a synthesized signal, and outputs the play list to said recording/reproducing means to record it onto the recording medium.

7. An apparatus according to claim 6, wherein said control means further generates a play list for controlling the reproduction operation so as to synthesize the still image signal for a predetermined time period.

8. An apparatus according to claim 6, wherein said control means further generates a play list for controlling the reproduction operation so as to synthesize the still image signal as a subimage with the moving image signal.

* * * * *